(12) United States Patent
Jaillet et al.

(10) Patent No.: US 6,508,963 B1
(45) Date of Patent: Jan. 21, 2003

(54) MANUFACTURING PROCESS FOR A SEAT CUSHION OR SIMILAR FOR AN AUTOMOBILE VEHICLE

(75) Inventors: Laurent Jaillet, Guillerval (FR); Hervé Rancon, Bondoufle (FR); Yves Le Pimpec, Etampes (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 79 days.

(21) Appl. No.: 09/722,254

(22) Filed: Nov. 27, 2000

(30) Foreign Application Priority Data

Dec. 1, 1999 (FR) .............................................. 99 15130

(51) Int. Cl.[7] .............................................. B29C 44/06
(52) U.S. Cl. ...................... 264/46.6; 264/46.4
(58) Field of Search ................ 264/46.4, 46.6, 264/46.8

(56) References Cited

U.S. PATENT DOCUMENTS

| | | | |
|---|---|---|---|
| 4,138,283 A | * 2/1979 | Hanusa | 156/77 |
| 4,287,143 A | * 9/1981 | Sears, Jr. et al. | 264/46.6 |
| 4,400,422 A | * 8/1983 | Smith | 428/160 |
| 5,132,063 A | * 7/1992 | Hughes | 264/46.4 |
| 5,294,386 A | * 3/1994 | Roth et al. | 264/46.6 |
| 6,083,337 A | * 7/2000 | Bailey et al. | 156/475 |

FOREIGN PATENT DOCUMENTS

| | | |
|---|---|---|
| DE | 3728923 A1 | 8/1987 |
| WO | WO 97/43101 | 11/1997 |

* cited by examiner

*Primary Examiner*—Allan R. Kuhns
(74) *Attorney, Agent, or Firm*—Connolly Bove Lodge & Hutz LLP

(57) ABSTRACT

A process for manufacturing a cushion made of polyurethane foam covered with a cover comprises the initial step of placing the cover in a mould having the shape of the cushion to be obtained, the cover having a front face forming the exterior decoration layer which is placed against the inside wall of the mould and a rough back face facing towards the inside of the mould. Then a film of thermoplastic material is placed on the rough back face of the cover, the film containing agents reacting with polyurethane isocyanate, the film being initially permeable to water vapor. Then polyurethane is injected into the mould to form said foam by expanding. The film has a plastification capability under the effect of chemical reactions occurring between the material of the film and the isocyanate contained in the polyurethane. The film further has a sufficiently low predetermined thickness so that the polyurethane foam passes through the film and anchors onto the back face of the cover during expansion and under the effect of the pressure generated by the expansion.

7 Claims, 2 Drawing Sheets

MANUFACTURING PROCESS FOR A SEAT CUSHION OR SIMILAR FOR AN AUTOMOBILE VEHICLE

FIELD OF THE INVENTION

BRIEF DESCRIPTION OF THE INVENTION

This invention concerns the manufacture of polyurethane foam cushions with covers especially for automobile vehicle seats but which can also be used for other automobile interior components, for example: headrests, armrests, dashboards, door panels, roofs, etc.

BACKGROUND OF THE INVENTION

Two main techniques are used for the manufacture of such cushions.

According to a first technique, the foam padding is manufactured by expansion of foam in a mould shaped to the form of the cushion to be obtained. Then the cover is assembled on the padding by bonding or by mechanical attachment for the so-called traditional padding methods.

According to the second technique, also called "in-situ manufacture", a mould shaped to the form of the cushion to be obtained is used in which the prepared cover is placed, utilisation face against the surface of the mould. The cover can be held in place in the mould by various means, especially by suction through the surface of the mould. Then the polyurethane foam is moulded, on the back of the cover, in the mould where it is expanded in a manner known per se, after having closed the mould, to take the form of the mould.

In common practice, the cover consists of a compound textile (textile and foam back) that is, with, on its face located on the cushion internal side, a sublayer consisting of a more or less thin covering, generally cellular (the foam back), which can favour the adhesion with the foam by penetration of the foam into the sublayer of the cover.

However, in this case, the polyurethane foam may have a tendency to traverse the material of the cover, which is of course not acceptable for obvious aesthetic and comfort reasons. To avoid this problem, it is known to use for the cover a composite material, generally designed as "complex", integrating either an impervious film protecting the fabric or the decorative covering, or a sufficiently thick layer of cellular flexible material to prevent the polyurethane foam of the padding from completely passing through the cover, this process being known as the "permeable in-situ process".

If a cellular layer is used alone, this layer must be sufficiently thick, for example around 4 to 7 mm, dense and with air permeability as low as possible. However, this air permeability is difficult to achieve in a satisfactory and reproducible manner. Moreover, the parts obtained have foam overdensifications, that is zones where the foam is more compact, under the textile cover. They can also have penetrations of foam into the cellular sublayer detrimental to comfort and to feel. These overdensification and penetration phenomena are also the consequence of the negative pressure applied through the wall of the mould, passed on through the cover, which creates heat losses and a suction effect of the polyurethane foam within the thickness of the material of the cover.

If an impervious film is used, the hygrothermic comfort of the resulting cushion is very poor due to the air and water vapour impermeability at cushion surface. It has already been proposed to solve this problem by making the films used permeable to vapour and to air after moulding either by mechanical means such as needles perforating the film or by at least partial destruction of the film during or after the foaming of the polyurethane, for example by heat. A notable disadvantage is that the destruction of the film is difficult to control, the synchronisation between the polyurethane curing reaction and the effect of the destruction of the film being especially tricky: either the destruction of the film occurs too early during the foaming and leads to a risk of the polyurethane penetrating the cover or, on the contrary, the destruction of the film occurs only on completion of the moulding and, in this case, the adhesion between the foam and the cover is liable to be significantly degraded. In addition, the relatively high temperatures required, for example more than 120° C. to act on meltable films, is not suitable to all textiles and there is a risk that they will be degraded.

It has also been proposed, in document DE-A-3 728 923, to apply to the back of the cover, previously positioned in the mould, a layer intended to ensure impermeability during the subsequent expansion of the polyurethane foam. After the curing and the hardening of the foam and extraction of the cushion from the mould, the impermeable film applied to the back of the cover is made permeable to air by heat or water vapour which have the effect of destroying the said layer. The impervious layer is applied by spraying onto the back of the cover either a product consisting of or including sugar, gelatine, starch or modified gelatine, or a product with vinyl properties, for example polyvinyl alcohol, associated with acetic or boric acid salts. In both cases, the product is sprayed on in a liquid state then dried, for example by heating at 60°0 C. for gelatine, to obtain a solid impervious film adhering to the back of the cover. The impermeability of the film must be ensured until the end of the expansion of the polyurethane in the mould when it is degraded by heat or vapour on completion of curing to obtain the final permeability sought. Adhesion is obtained between the deposited film and the polyurethane foam thanks to the reaction between the material of the said film and the isocyanate contained in the polyurethane.

A disadvantage of this process is that the film obtained, with a thickness as stated from 50 to 400 micrometers is not very flexible and tends to break. The process must therefore be performed after the cover has been placed and held in the mould. Moreover, after the heat or vapour treatment, the adhesion between the polyurethane foam and the cover may be degraded as the impermeability of the film during the expansion of the foam prevents the bond between the foam and the cover. Furthermore, the later destruction of the film, at least partial, tends to eliminate the bonds existing between the film and the cover.

The aim of this invention is to avoid these disadvantages and to propose a process for the manufacture of a cushion, or any other similar part, including polyurethane foam padding which ensures perfect adhesion between the foam and the cover and very good hygrothermic comfort by a permeability to water vapour. The invention aims also at proposing a process simple to perform without the need for specific treatment after moulding.

With these targets in mind, the subject of the invention is a process for manufacturing a polyurethane foam cushion covered with a cover where the cover is placed in a mould shaped to the form of the cushion to be obtained, the cover having a front face forming the exterior decorative layer which is placed against the inside wall of the mould and a rough back face, located towards the inside of the mould, then the polyurethane is injected in the mould and forms the said foam by expanding, characterised in that, before the polyurethane is injected, a film of a thermoplastic material containing agents reacting with the isocyanate, said film being initially permeable to water vapour, is placed on the rough back face of the cover, the said film having a plastification capability under the effect of the chemical reactions occurring between the material of the film and the isocyanate contained in the polyurethane and a sufficiently low predetermined thickness so that the polyurethane foam can, during its expansion and under the effect of the pressure generated by the said expansion, pass through the said film and anchor onto the back face of the cover.

The process according to the invention is based on the use of a thermoplastic film, placed in contact with the cover before moulding, injection or spraying of the polyurethane, which has intrinsic water vapour permeability properties but which however is sufficiently impermeable to air and liquids to prevent it from being traversed directly by the polyurethane at the start of moulding which therefore avoids all direct contact between the polyurethane and the cover.

A polysaccharide- or animal protein-base film associated with a plastifying agent selected from among: caprolactone, polylactic acid, cellophane, paper, polyethylene and isocyanate will preferably be used. The polysaccharides and proteins comprising a large proportion of the composition of the film, for example 50 to 90%, have the advantage of reacting with the isocyanate contained in the polyurethane formulas due to the hydroxyl properties present in the film material. The result is a good film wetting capability by the polyurethane and therefore good adhesion between the film and the polyurethane foam.

Moreover, due to the permeability of the film, the physicochemical phenomena acting between the polyurethane foam being formed and the film, in particular the heat input during foaming, which is due to the exothermic reaction between the isocyanate and polyol leading to the formation of the foam, the said thermal input, combined with the reaction of the polyurethane with the material of the film, causing a softening of the film when the foam is in the final expansion phase, the pressure exerted by the said expanding foam and lastly, the low film thickness, the polyurethane foam at end of expansion impregnates and passes through the film to adhere to the back face of the cover but this at a time when, although still retaining some tackiness, it has reached a relatively high viscosity, sufficient to limit the wetting of the cover.

The passing of the polyurethane through the film at end of moulding can be explained, according to a hypothesis put forward by the inventors, by the fact that the film is pressed by the expansion of the foam against the back face of the cover, this face having a rough finish due to the use of a cellular material sublayer or a material with, at macroscopic scale, a significant roughness, such as a bare textile, coated or assembled with an unwoven or agglomerated fibre-base sublayer. Therefore, combined with the softening of the film due to its plastification mentioned above, the material of the film flows into the recesses or hollows of the back face of the cover until it at times fragments or breaks up thus enabling the polyurethane foam to progress into the surface layer on the back of the cover and adhere to it.

The advantages of this process are especially:

the possibility of obtaining a higher pressure during foaming when compared with the one obtained with processes of the "in-situ permeable" type thanks to the film barrier effect, direct adhesion between the cover and the foam without the need to use an adhesive film, absence of all exterior agents or additives due to the fact that the foam penetrates into the film under the direct effect of the pressure that it generates.

The thickness of the film is typically around 10 to 50 microns. Its melting point is between 60 and 150° C.

Its air permeability is lower than 1 liter/m$^2$/s under a pressure difference of 100 Pa, which is well below the air permeability of the composite materials, used conventionally for covers and employed in the so-called "in-situ permeable" process, which is around 40 to 200 liters/m$^2$/s. Its water vapour permeability is much higher than that of an impervious film and at least equal to that a cover composite material. As a comparison, the quantities of water exchanged, under the same measurement conditions, according to the method explained below, after 1 and 2 hours respectively are:

0.3 and 0.6 grams respectively for a conventional impervious-type film, 1 to 2 and 2 to 3 respectively for a conventional cover, and 1.5 to 3 and 3 to 6 respectively for a starch-base film used in compliance with the invention.

The hygrothermic comfort measurement method consists in using a measurement tool called sealed breathable module, or also called waterproof breathable module, which consists, on one side, of a so-called breathable membrane made of a material impermeable to water but permeable to water vapour, for example a microporous PTFE membrane and, on the other side, a sheet of material totally impervious to water and to water vapour, for example polyethylene. The membrane and the sheet are assembled by bonding or welding, for example using hot pressure, to form an impervious envelope. Two small tubes are used to supply the module with water. To make the measurement, at a predetermined temperature and relative humidity, 30 g of water are injected into such a breathable module. After 30 minutes, the module is weighed and placed on the surface of the material under test. Then, the weight of the module is recorded every 30 minutes. The quantity of water vapour absorbed by the material is calculated by the difference in the weights measured. A water vapour absorption curve for the material under test can thus be obtained versus time, representative of the hygrothermic comfort of the material.

Moreover, the reactivity, mentioned above, of the film with the isocyanate is characterised by a dissolution time of less than 10 minutes at a temperature of between 20 and 60° C. for a film sample immersed in pure isocyanate of the MDI (methylene-diparaphenylene isocyanate) or TDI (toluene diisocyanate) type. Note that the solubility of the film in the isocyanate combines with the heat supplied by the polyurethane curing reaction to facilitate the plastification of the above-mentioned film.

The film used also enables a limitation of the overdensification of the foam which can be usually observed under the surface of the cover in processes according to the earlier art.

The implementation of the process according to the invention also enables the thickness and costs of the textile compounds used for the covers to be reduced, authorises the use of compounds more permeable to air or bare or coated fabrics. It also enables the use of polyurethane formulas less reactive and more fluid than the formulas conventionally used in processes of the "insitu permeable" type mentioned at the start of this paper.

BRIEF DESCRIPTION OF THE FIGURES

Other characteristics and advantages will appear in the description which will follow of a process in compliance with the invention.

Refer to the appended drawings on which.

DETAILED DESCRIPTION

Figure 1:
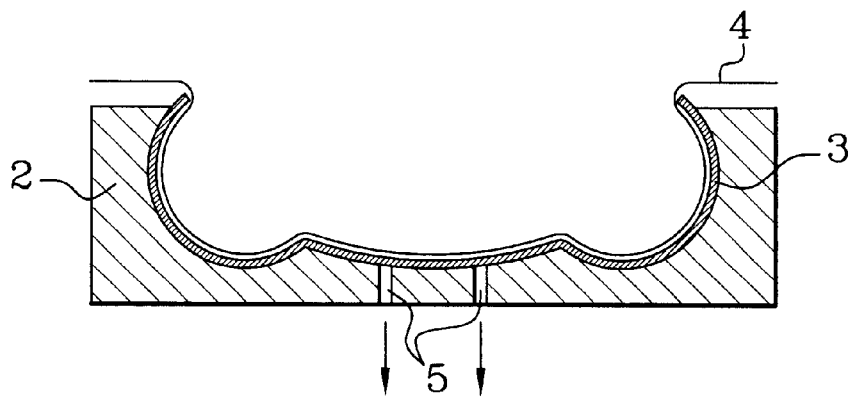
FIGS. 1 and 2 schematically illustrate the steps of the process.

FIG. 1 schematically illustrates a mould 2 including a hollow impression with a shape corresponding to that of the cushion 1 to be obtained. The cover 3, formed of a textile compound of a known type, is placed in this impression covered by a sheet of thermoplastic film 4. Suction is applied via the holes 5 of the mould to hold the cover in contact with the surface of the impression, the good air impermeability of the film facilitating retention in the mould.

Figure 2:
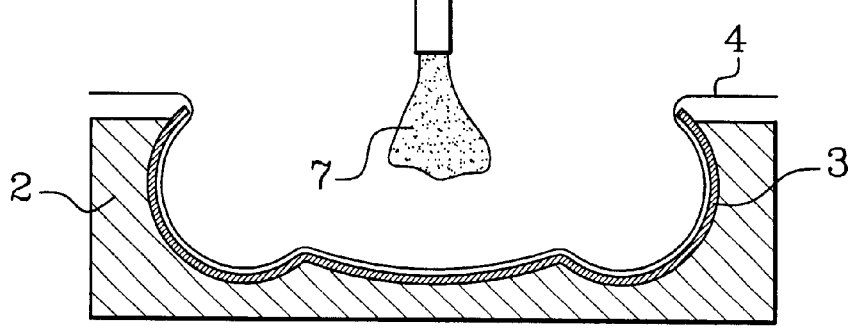

FIG. 2 illustrates the introduction of the polyurethane 7 in the mould via a nozzle 6, the polyurethane being simply deposited in a suitable quantity on the film 4. Then the mould is closed with a cover, not shown, in a manner known in itself, whilst the foam expands.

Figure 3:
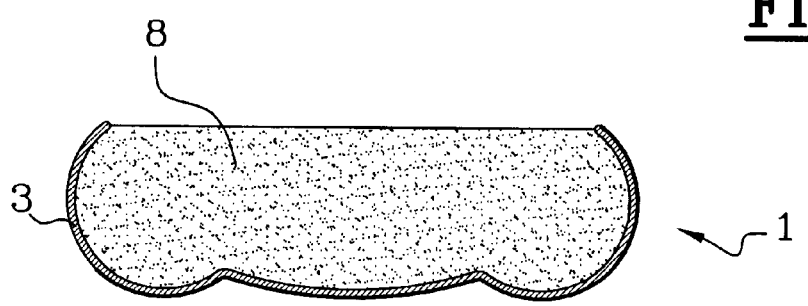
FIG. 3 shows a sectional view of a cushion obtained.

FIG. 3 shows the cushion obtained after demoulding, consisting of the textile cover 3 adhering to the polyurethane foam 8, the thermoplastic film located at the interface being then somewhat dissolved or integrated into the surface layer of the solidified foam after the said foam has impregnated until it has passed through and adhered to the back face of the cover. It is restated here that the bond between the cover and the polyurethane foam is direct, through the film, but without the film acting as a bounding intermediary layer. It is therefore of no importance that the film does not itself adhere to the cover.

Figure 4:
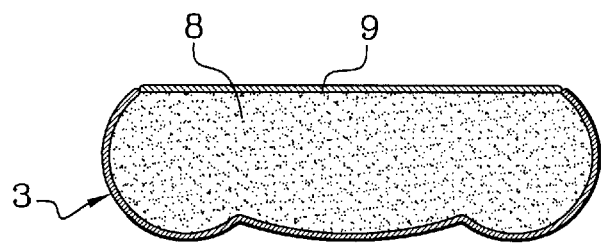
FIG. 4 shows a sectional view of a variant of the cushion obtained.

FIG. 4 shows a design variant of the cushion where the rear face of the polyurethane foam padding is also coated with a mechanical reinforcing web 9.

Figure 5:
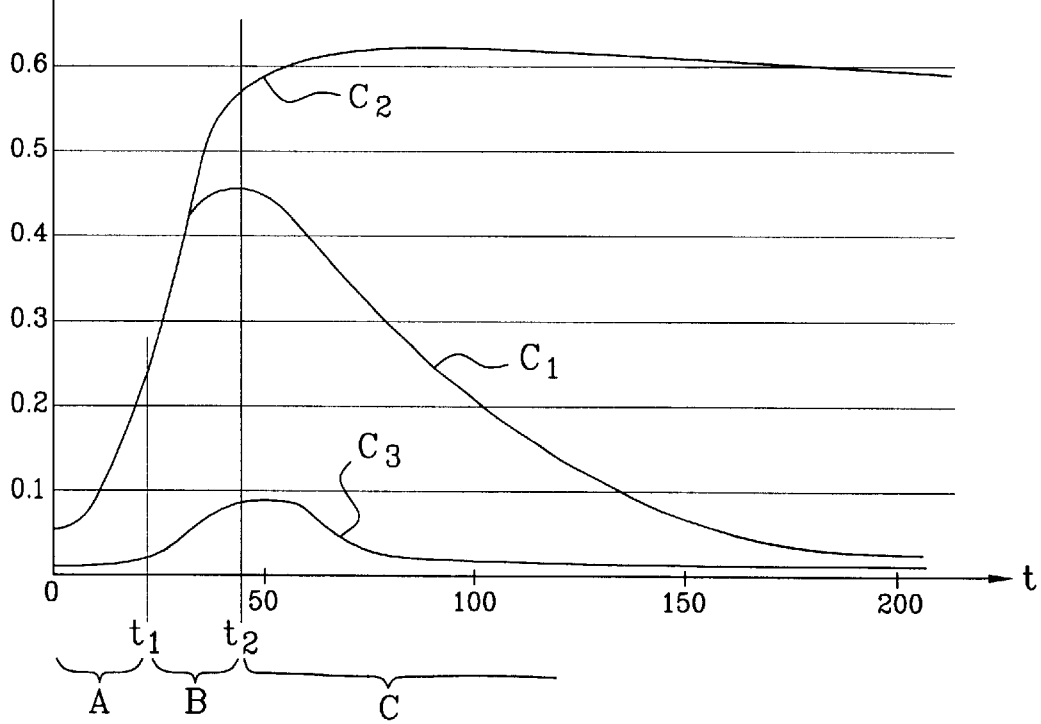
FIG. 5 is a graph illustrating the pressure in the mould versus time during moulding.

The graph on FIG. 5 shows change of pressure P in the mould versus time for the process according to the invention (plot $C_1$), for an "in-situ" type process according to the earlier technique with the use of an impervious film (plot $C_2$) and for an "in-situ permeable" type process (plot $C_3$).

Initially, during phase A, up to time $t_1$, when the film has its original air and polyurethane impermeability characteristics, the deposited polyurethane expands and fills the mould. The expansion reaction continues, the pressure increases in the mould (phase B) to a maximum reached at $t_2$. The foam then exerts a high pressure on the film which, being simultaneously softened and reacting with the injected polyurethane isocyanate becomes permeable and allows the foam to pass through as was explained previously. In phase C, after $t_2$ the foam which has impregnated the film remains tacky, adheres to the cover and simultaneously becomes increasingly pasty. The pressure drops during this time due to the permeability then offered by the decomposed or fragmented film.

It can be seen that the use of the film according to the invention enables a high moulding pressure to be obtained approaching the one reached in the process using an impervious film illustrated by curve $C_2$, and much higher than in the traditional "in-situ permeable" type process represented by curve $C_3$ without however creating excessive impregnation of the polyurethane in the cover whilst ensuring hygrothermic comfort and a better feel, an advantage of moulding under high pressure being precisely the obtaining of a better more uniform quality of foam and therefore avoiding overdensifications.

According to a first example of the use of the process, a 10 to 40-micron thick polysaccharide-base film is used placed on a composite consisting of a cellular layer with a thickness between 1 and 4 mm. The polyurethane is a formulated polyol- (polyol+water+catalyst+stabilising additive) and isocyanate-base polyurethane of the MDI type, normally used in manufacturing processes of the "in-situ" type with a free density of 20 to 70 kg/m³, an expansion time of between 3 and 90 seconds and a tack free time of between 6 and 240 seconds. The part obtained has a foam penetration into the cover composite of less than 0.5 mm and an overdensification layer, measured according to the method described below, of between 40 and 100%, whereas it reaches 150 to 300% with earlier processes. The hygrothermic comfort is similar to that of parts manufactured according to the "in-situ permeable" process. Cover composite peel tests show a strength equivalent to that of the earlier technique at temperatures of 23° C. and 100° C.

The overdensification measurement method consists in comparing the densities of the two foam samples alone, taken respectively from near to the surface, for example in a surface layer of 6 mm thick (density D) and at the core of the foam, for example in a 12 mm thick underlaying layer (density d). The overdensification value is calculated by the formula (D−d)*100/d.

Figure 6:
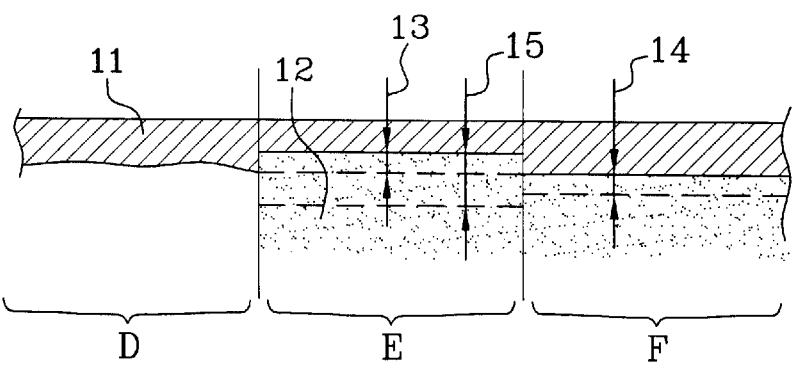
FIG. 6 is a sectional view of a comparative illustration of the surface zone of a cushion.

As a comparison, the sectional view on FIG. 6 shows, in case D, the zone near to the surface of a cover formed of a textile composite alone 11, in the case E, a cushion with a foam padding 12, obtained by the "in-situ permeable" process and, in case F, a cushion obtained according to the process of the invention. It can be seen that in case E, there is a zone 13 where the foam penetrates into the composite 11 with a certain thickness, whereas in case F, the penetration is not perceptible. It can also be seen that the thickness of the overdensification zone 14 in case F is much lower than that of zone 15 in case E.

According to a second example, a film 20 to 50 -microns thick is used placed on a composite consisting of a cellular layer with a thickness between 2 and 5 mm and a polyurethane foam generally used to manufacture bare parts, with a free density of 25 to 50 kg/m³, an expansion time of between 30 and 300 seconds and a tack time of between 45 and 500 seconds. The part obtained has a foam penetration into the cover composite of less than 1.0 mm and an overdensification layer, determined according to the above-mentioned method, of between 50 and 300%, whereas comparatively, the penetration is total in the case where the textile composite of the cover is used alone. The hygrothermic comfort and peel test results are equivalent to those given above.

The invention is applicable to all processes used to manufacture polyurethane foam padding by foaming, injection or spraying where the temperature remains lower than 120° during the manufacture of the product and where mix reaction temperature is between 23° C. and 150° C.

The invention is not limited to the manufacture of seat cushions and can, in particular, apply to any car passenger compartment filling or padding items. The polyurethane foam can then be also of the semi-rigid or elastomeric type. The process can also be used to ensure the adhesion of the polyurethane foam with composites or other reinforcement materials even non-impervious such as unwoven materials used, for example, on the rear or lower faces of paddings, that is the face which is not visible in general use, to increase the mechanical strength at the surface of the foam. Limiting the penetration of the foam into these materials enables a reduction in the quantities of polyurethane used in the paddings and therefore a reduction in the density of these.

Also, instead of placing the film on the back of the cover in the mould as stated previously, a film pre-bonded with the cover composite could be used especially before cutting out and assembly, for example by stitching, of the constituent components of the cover. For example, the film in compliance with the invention could be assembled on the composite by continuous feed, by pasting by means of a thermoplastic adhesive or by flame treatment, process according to which the back surface layer of the composite polyurethane is partially melted then the thermoplastic film made sticky by the melting process is applied to this surface.

What is claimed is:

1. Process for manufacturing a cushion made of polyurethane foam covered with a cover, comprising the steps:

placing the cover in a mould having the shape of the cushion to be obtained, the cover having a front face forming the exterior decoration layer which is placed against the inside wall of the mould and a rough back face facing towards the inside of the mould;

placing a film of thermoplastic material on the rough back face of the cover, the film containing agents reacting with polyurethane isocyanate, said film being initially permeable to water vapour;

injecting polyurethane into the mould to form said foam by expanding;

said film having a plastification capability under the effect of chemical reactions occurring between the material of the film and the isocyanate contained in the polyurethane;

said film further having a sufficiently low predetermined thickness so that the polyurethane foam passes through said film and anchors onto the back face of the cover during expansion and under the effect of the pressure generated by said expansion.

2. Process in accordance with claim 1, wherein the film is a polysaccharide or animal protein-base film associated with a plastifying agent selected from the group consisting of: caprolactone, polylactic acid, cellophane, paper, polyethylene, and isocyanate.

3. Process in accordance with claim 2, wherein starch, polysaccharide or protein proportion in the film is between 50 and 90%.

4. Process in accordance with claim 1, wherein the film has a thickness of between 10 and 50 microns.

5. Process in accordance with claim 1, wherein the film has a melting point of between 60 and 150° C. and a dissolution time in isocyanate of less than 10 minutes at a temperature of between 20 and 60° C.

6. Process in accordance with claim 1, wherein the air permeability of the film is lower than 1 liter per square meter, per second, under a pressure difference of 100 Pa.

7. Process in accordance with claim 1, wherein the film is bonded to the back surface of the cover by assembly with a composite comprising the cover before cutting out and assembling constituent parts of the cover.

* * * * *